(12) United States Patent
Walstad et al.

(10) Patent No.: US 12,171,213 B2
(45) Date of Patent: Dec. 24, 2024

(54) RODENT TRAP, SYSTEM FOR REFILLING A RODENT TRAP AND METHOD OF REFILLING A RODENT TRAP

(71) Applicant: SWISSINNO SOLUTIONS AG, St. Gallen (CH)

(72) Inventors: Dennis Walstad, Elburn, IL (US); Silvin Jancic, Villmergen (CH)

(73) Assignee: SWISSINNO SOLUTIONS AG, St. Gallen (CH)

( * ) Notice: Subject to any disclaimer, the term of this patent is extended or adjusted under 35 U.S.C. 154(b) by 177 days.

(21) Appl. No.: 17/276,584

(22) PCT Filed: Jul. 3, 2018

(86) PCT No.: PCT/EP2018/067888
§ 371 (c)(1),
(2) Date: Mar. 16, 2021

(87) PCT Pub. No.: WO2020/007448
PCT Pub. Date: Jan. 9, 2020

(65) Prior Publication Data
US 2024/0000061 A1    Jan. 4, 2024

(51) Int. Cl.
*A01M 23/30* (2006.01)
*A01M 23/26* (2006.01)

(52) U.S. Cl.
CPC ............ *A01M 23/30* (2013.01); *A01M 23/26* (2013.01)

(58) Field of Classification Search
CPC ...... A01M 23/30; A01M 23/26; A01M 23/00; A01M 23/24; A01M 23/245; A01M 23/265
See application file for complete search history.

(56) References Cited

U.S. PATENT DOCUMENTS 2,637,931 A * 5/1953 Sklar ............... A01M 23/30
                                              43/83.5
4,991,340 A   2/1991 Schildt
(Continued)

FOREIGN PATENT DOCUMENTS

WO    WO-03063588 A1    8/2003
WO    WO-2005099451 A1  10/2005

OTHER PUBLICATIONS

International Search Report and Written Opinion of the International Searching Authority, issued in PCT/EP2018/067888, mailed Nov. 6, 2018; ISA/EP.
(Continued)

*Primary Examiner* — Brady W Frazier
*Assistant Examiner* — Shanna Danielle Glover
(74) *Attorney, Agent, or Firm* — Harness, Dickey & Pierce, P.L.C.

(57) ABSTRACT

A rodent trap (1) for catching and killing rodents, in particular mice and/or rats comprises clamp means (2) at least having an upper jaw part (3) and a lower jaw part (4). The upper jaw part (3) is able to swing relative to the lower jaw part (4) from an open position to a closed position in which it hits and kills a rodent. The upper jaw part is at least partially rotatable around a jaw rotational axis ($A_{jaw}$). A lifting lever (5) for releasing the clamp means (2) from the opened position is comprised. The lifting lever (5) is activatable by a rodent on the first side (f) of the jaw rotational axis ($A_{jaw}$). A force means enables the clamp means (2) to change from the open position into the closed position when released. The force means in particular is at least one spring. The lifting lever (5) comprises a latch means (7) on a latch side (LS) of the lifting lever (5) which is arranged on a second side (s) of the jaw rotational axis ($A_{jaw}$), opposite of the first side (f) of the jaw rotational axis ($A_{jaw}$).

19 Claims, 10 Drawing Sheets

(56) References Cited

U.S. PATENT DOCUMENTS

Figure 1:
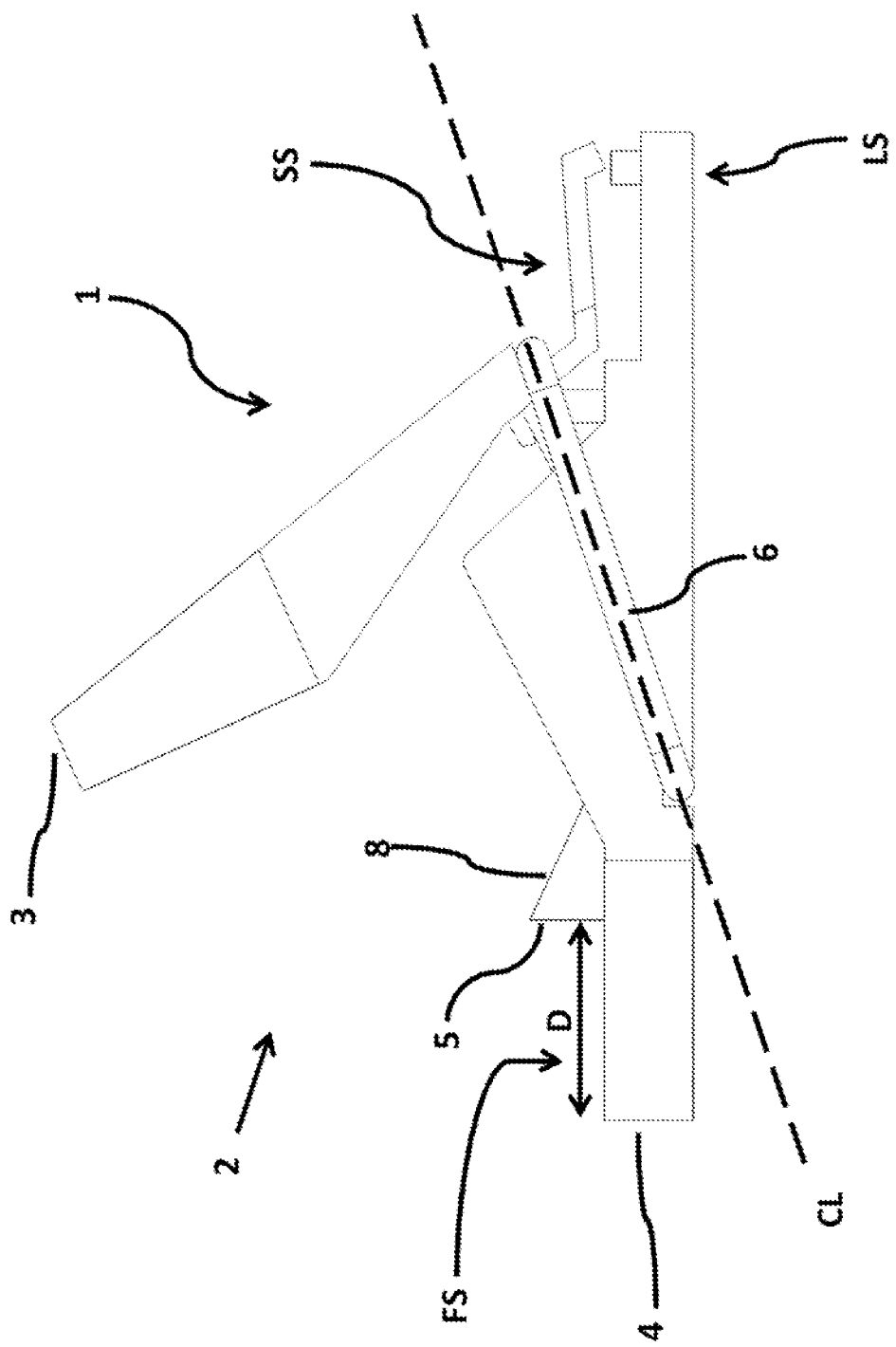

| | | | |
|---|---|---|---|
| 5,960,583 A | 10/1999 | Hansson | |
| 9,210,924 B1 | 12/2015 | Terrell | |
| 2010/0257773 A1* | 10/2010 | O'Dell | A01M 23/26 43/88 |
| 2016/0029616 A1* | 2/2016 | Johnston | E06B 7/2309 43/132.1 |
| 2018/0312317 A1* | 11/2018 | Petrous | A01M 23/30 |

OTHER PUBLICATIONS

International Preliminary Report on Patentability, issued in PCT/EP2018/067888 dated Jan. 5, 2021.

* cited by examiner

RODENT TRAP, SYSTEM FOR REFILLING A RODENT TRAP AND METHOD OF REFILLING A RODENT TRAP

CROSS-REFERENCE TO RELATED APPLICATIONS

This application is a 371 U.S. National Phase of International Application No. PCT/EP2018/067888, filed Jul. 3, 2018. The entire disclosure of the above application is incorporated herein by reference.

The invention concerns a rodent trap, a system for refilling a rodent trap and method for refilling a rodent trap according to the independent claims.

Generally, rodent traps for catching and killing rodents are known from the prior art. There are traps such as the trap disclosed in U.S. Pat. No. 4,991,340 which comprises two jaws which are closed when a rodent steps on a trigger. Those kinds of mouse traps have the disadvantage that they can close accidentally and even catch birds when they step on the trigger.

WO 2005/099451 discloses an animal trap comprising a complicated mechanism to trigger a shackle killing the animal. Such a complicated mechanism is costly to produce and very sensitive to outer influences when the trap is moved or touched by other animals.

It is therefore the object of the present invention to create a mouse trap which overcomes the disadvantages of the prior art and in particular create a mouse trap which is easy to produce and safe and reliable in use and more effective and human in killing.

The object is achieved by a rodent trap, a system for refilling a rodent trap and a method of refilling a rodent trap according to the independent claims.

The object is particularly achieved by a rodent trap for catching and killing rodents, in particular mice and/or rats comprising the following features. The rodent trap comprises clamp means which have at least an upper jaw part and a lower jaw part. The upper jaw part is able to swing relative to the lower jaw part from an open position to a closed position, in which it hits and kills a rodent. Furthermore, the upper jaw part is at least partially rotatable around a jaw rotational axis. The rodent trap comprises a lifting lever for releasing the clamp means from the open position, the lifting lever being activatable by a rodent on a first side of the jaw rotational axis. The rodent trap further comprises force means, in particular at least one spring, enabling the clamp means to change from the open position into the closed position when released. The lifting lever comprises a latch means on a latch side of the lifting lever being arranged on a second side of the jaw rotational axis opposite of the first side of the jaw rotational axis.

Such a rodent trap is safe to use and efficient in killing the animals and cheap to produce.

The upper jaw part can swing from an open position to a closed position and preferably it can swing back from a closed position to an open position. The swinging from a closed to an open position requires an opening force, hence against the force means, the swinging to the closed position is actuated by the force means.

Preferably the lifting lever is a one piece lever, interacting directly with the clamp means. No further levers are arranged between the lifting lever and the clamp means. The force means preferably comprises exactly one spring. The force means can alternatively comprise more than one spring, such as two or more. Preferably, the rodent trap is made entirely from plastic material, except the force means which also can be a metal material. In case of a force means in form of a spring, the spring can be a metal or non-metal garter spring or alternatively a metal spiral spring or a rubber spring or a rubber band.

The lifting lever preferably is only activatable by being lifted upwards, in particular away from the lower jaw part of the trap.

This way the trap can only be activated when intentionally lifting the lever and thereby accidental stepping on the trigger by other animals does not lead to activating the trap.

In that case the lower jaw part preferably comprises a base floor and an edge. The lifting lever preferably lifts away from the base plate of the lower jaw part.

The lifting lever can comprise a rodent accommodating element, in particular having at least partially a rounded shape, arranged opposite of the latch side.

The rodent accommodating element leads to guiding the rodent into the right position for activating the trap. For that purpose the rodent accommodating element is adapted to the head of a rodent and has preferably at least partially a rounded shape. Alternatively, the rodent accommodating element can also be triangular or square. Furthermore, the rodent accommodating element preferably is funnel shaped such that the rodent easily fits into the rodent accommodating element.

The force means can exert a closing force on the upper jaw part and the lower jaw part in the closed position such that both jaws are pressed against each other. In particular, a longitudinal centerline of the force means is located beside the jaw rotational axis, preferably located on the first side of the jaw rotational axis.

This way the strongest force is exerted on the jaw parts when they are closed. The longitudinal centreline of the force means is the direction of force of the force means. The longitudinal centerline is substantially perpendicular to the jaw rotational axis. The longitudinal centerline of the force means is located closer to the jaw rotational axis when the clamp means is in the open position. When the clamp means is in the closed position, the longitudinal centerline is farther away from the jaw rotational axis compared to the open position, providing a bigger clamping force.

The force means can exert a lower force on the upper and the lower jaw part in the open position than in the closed position. The force means in particular exerts substantially close to no force in the open position compared to the closed position. Preferably, the longitudinal centreline of the force means is aligned with the jaw rotational axis or located slightly on the first side of the jaw rotational axis in the opened position.

Slightly in this context means that a distance between the jaw rotational axis and the longitudinal centreline perpendicular to the jaw rotational axis is smaller than a third of the length of the lifting lever, preferably smaller than the second length of the lifting lever.

A first length of the lifting lever on the first side of the jaw rotational axis can be longer than a second length of the lifting lever on the second side of the jaw rotational axis.

This way the movement needed by the rodent to lift the lever is bigger compared to the distance needed to unlock the latch on the second side of the lifting lever. This enhances the security of the trap.

The upper jaw part can comprise a latch receiving element to be latched in the opened position by the latch means.

This way the trap is easily fixed in the open position and easily released when needed by the lifting lever.

A bait holding element can be arranged in the vicinity of the lifting lever, preferably at least partially underneath the lifting lever, in particular beneath the rodent accommodating element, wherein preferably the bait holding element extends from beneath the rodent accommodating element to a substantially a front part of the lower jaw part.

The use of bait holding element in the vicinity of the lifting lever entices the rodent into the trap and to the lifting lever. In case the bait holding element extends from beneath the rodent accommodating element to substantially front part of the lower jaw part, a rodent can eat part of the bait without being in danger and without being caught. This way the rodents lose their cautiousness and the probability of catching the rodent and killing it instantly is increased.

The front part of the lower jaw part preferably is an edge arranged on a base part of the lower jaw part. In case both jaw parts have edges that extend above their respective basis closing of the trap leads to a directed hit onto the neck and thereby instant death of the rodent. The edge can be a rounded edge or a toothed edge or a combinations thereof.

A distance between the front part of the lower jaw part and a rodent accommodating element substantially perpendicular to the jaw rotational axis can be for a mouse trap in a range of 10 mm to 30 mm, preferably 12 mm to 20 mm, most preferably substantially 13 to 18 mm, or for a rat trap in a range of 30 mm to 50 mm, preferably 33 mm to 45 mm, most preferably 38 to 42 mm. (we refer here to "D" in FIG. 1)

Depending on the rodent to catch those distances lead to the perfect positioning of the front part of the lower jaw part and the front part of the upper jaw part in the area of the neck of the rodent when the rodent is enticed by the bait into the rodent accommodating element. This way the rodent dies quickly and painless.

The bait holding element can include a cap.

A cap protects the bait inside the bait holding element in case the trap is not in use. The cap can be removed before use. The cap additionally can comprise one or more, preferably two, wings, being adapted to keep the lifting lever in a lifted positions. This prevents unintentional activation of the trap by disengaging the latch. The wings can be arranged on at least one preferably two sides of the cap, in an area of the cap, which is arranged under the lifting lever, preferably the rodent accommodating element while the cap is covering the bait holding The bait holding element can be part of the lower jaw part.

This way the bait holding element is fixed on the lower jaw part or even a structural part of the lower jaw part and thereby is easily refillable.

The lifting lever can comprise a lever rotational axis which is preferably arranged on the second side of the jaw rotational axis. The latch means are preferably at least partially arranged substantially perpendicularly above or slightly beside the lever rotational axis.

Such an arrangement leads to optimal lever relations and thereby to secure opening and releasing of the latch when the rodent is inside the rodent accommodating element and lifts the lever.

The lifting lever can comprise a substantially two-prong fork shaped end on the latch side of the lifting lever.

This design enables an easy attachment of the lifting lever on the lower jaw part. The lifting lever is fixed to the lower jaw part by pushing together the two-prong fork shaped end and thereby snapping small bolts into the lower jaw part and thereby create the lever rotational axis.

The lower jaw part can comprise a blocking element which is arranged between the two-prongs of the fork shaped and of the lifting lever to prevent the lever to release from the lower jaw part.

This way the lever can easily be connected with the lower jaw part but is fixed in his position after attaching it to the lower jaw part. Furthermore, the use of the blocking element is a very cheap and secure way to secure the lifting lever.

The lifting lever can comprise a fixing element being arranged at the lever rotational axis, wherein the fixing element is arranged in a slot. The slot preferably comprises at least one holding element.

The fixing element fixes the lifting lever on the lower jaw part of the rodent trap, but is nevertheless rotatable in the slot. Preferably, the fixing element has a rectangular cross section. The sides extending along the length of the lifting lever are longer than the sides than the sides perpendicular to the length of the lifting lever. The holding element is arranged such that the lever is fixed in the slot when in an assembled state.

This way the lifting lever can easily be assembled and is securely fixed in its position.

The lifting lever can have a length of 3 cm to 7 cm, in particular substantially 4 cm to 6 cm for mouse trap and has a a length of 8 to 13 cm, in particular substantially 9 to 11 cm for rat trap.

Such a lifting lever leads to an optimal distance to lift the lever before the latches released and optimum distance between rodent accommodating element of the lifting lever and front part or edge of the lower jaw part. The rodent accommodating element is part of the lever and therefore included in the length of the lever.

The lifting lever can comprises a rotational length $L_{rot}$ which extends from a front of the rodent accommodating element to the rotational axis $A_{lever}$ of the lifting lever. The latch means comprise a length $L_{latch}$ which extends from the rotational axis $A_{lever}$ of lifting lever the point of the latch means where the latch means hook into the latch receiving element. The rotational length $L_{rot}$ of the lifting lever is larger than the latch length $L_{latch}$ to enable a small movement of the lifting lever.

This enable as reliable and quick activation of the trap.

The upper jaw part can comprise an opening or dormer-shaped element to allow for more space for the rodent accommodating element.

This has the advantage that the trap can be as small as possible and nevertheless the rodent accommodating element can have a perfect size of the respective rodent.

The object of the invention is further accomplished by a system for refilling a rodent trap as previously described comprising a syringe with bait refill.

The syringe with a bait refill is an optimal method for refilling the bait holding element inside the rodent trap. Preferably, the bait used is peanut butter. Furthermore, due to the special shape of the bait holding element, the use of the syringe enables a refilling of the bait holding element along its entire length and underneath the rodent accommodating element without endangering fingers to be trapped accidentally.

The object of the invention is further accomplished by a method of refilling a rodent trap as previously described, in which the rodent trap is arranged in the open position and the bait is refilled, preferably into the bait holding element, using a syringe comprising bait, preferably peanut butter.

The advantages of the system similarly apply to the method.

The object of the invention is further achieved by a method of catching and preferably killing a rodent comprising the step of positioning a rodent trap as previously described on a surface and putting the rodent trap into the open position.

Such a method reliably and quickly catches and kills a rodent and thereby is an animal friendly way of catching and killing rodents.

The bait holding element preferably extends along a direction perpendicular to the jaw rotational axis, called bait holder length, longer than in the direction parallel to the jaw rotational axis, called bait holder width. Preferably the bait holder length is at least three times, more preferably four times, larger than the bait holder width. This way the bait holding element basically leads the rodent into the rodent accommodating element. Furthermore, bait holding element can comprise rounded corners inside the rodent accommodating element to optimally position the bait holding element beneath the rodent accommodating element.

Figure 2:
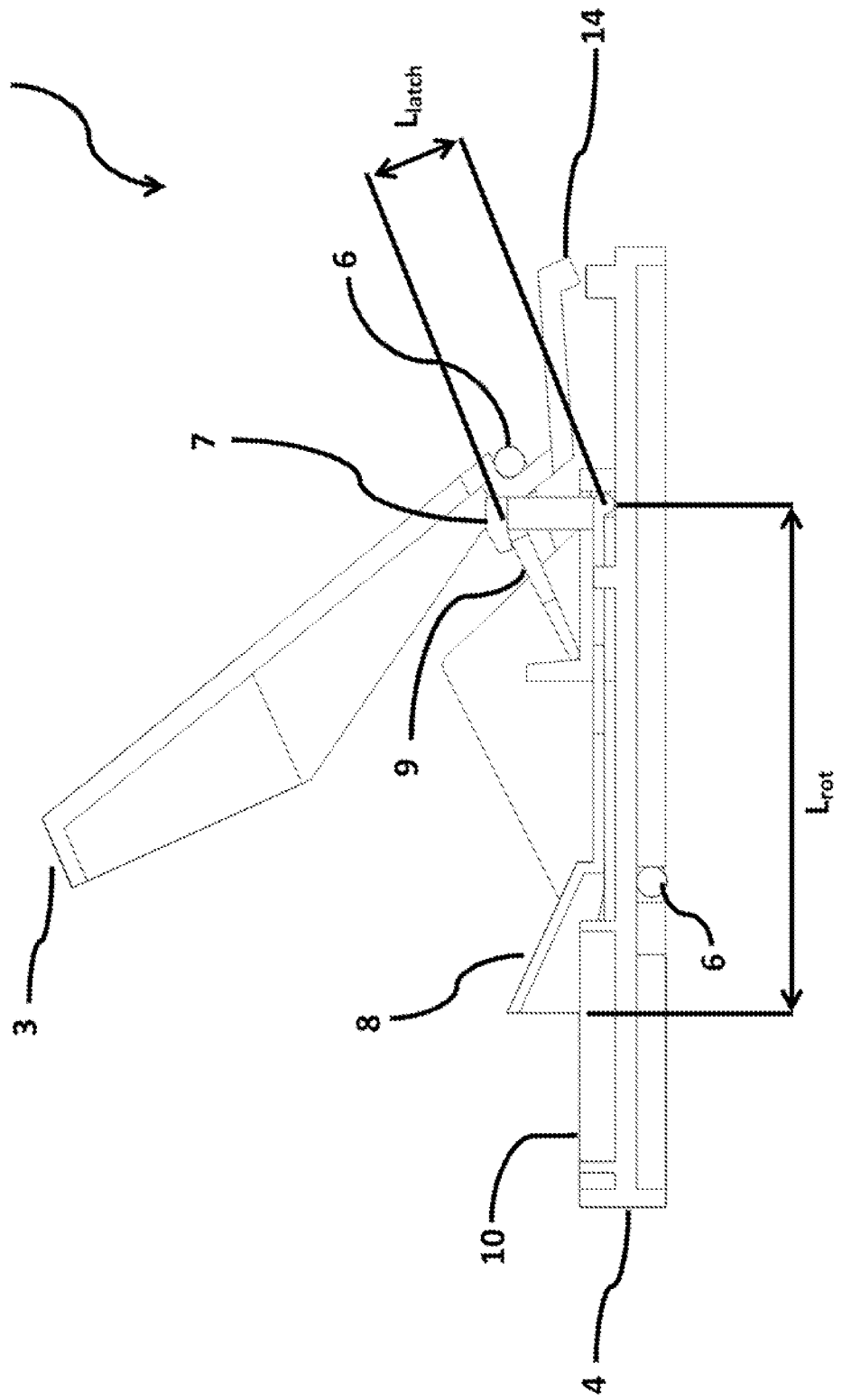
Figure 3:
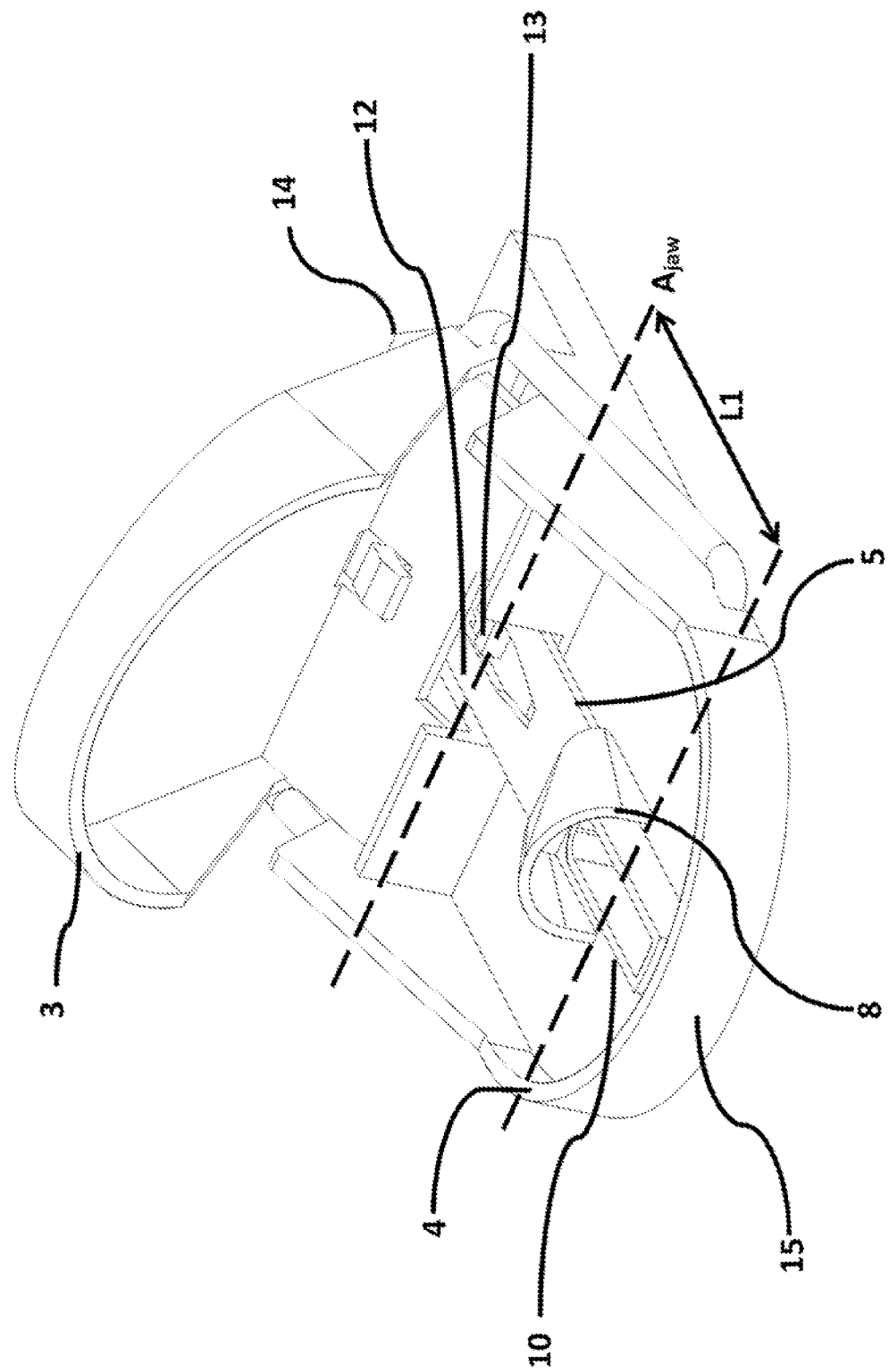
Figure 4:
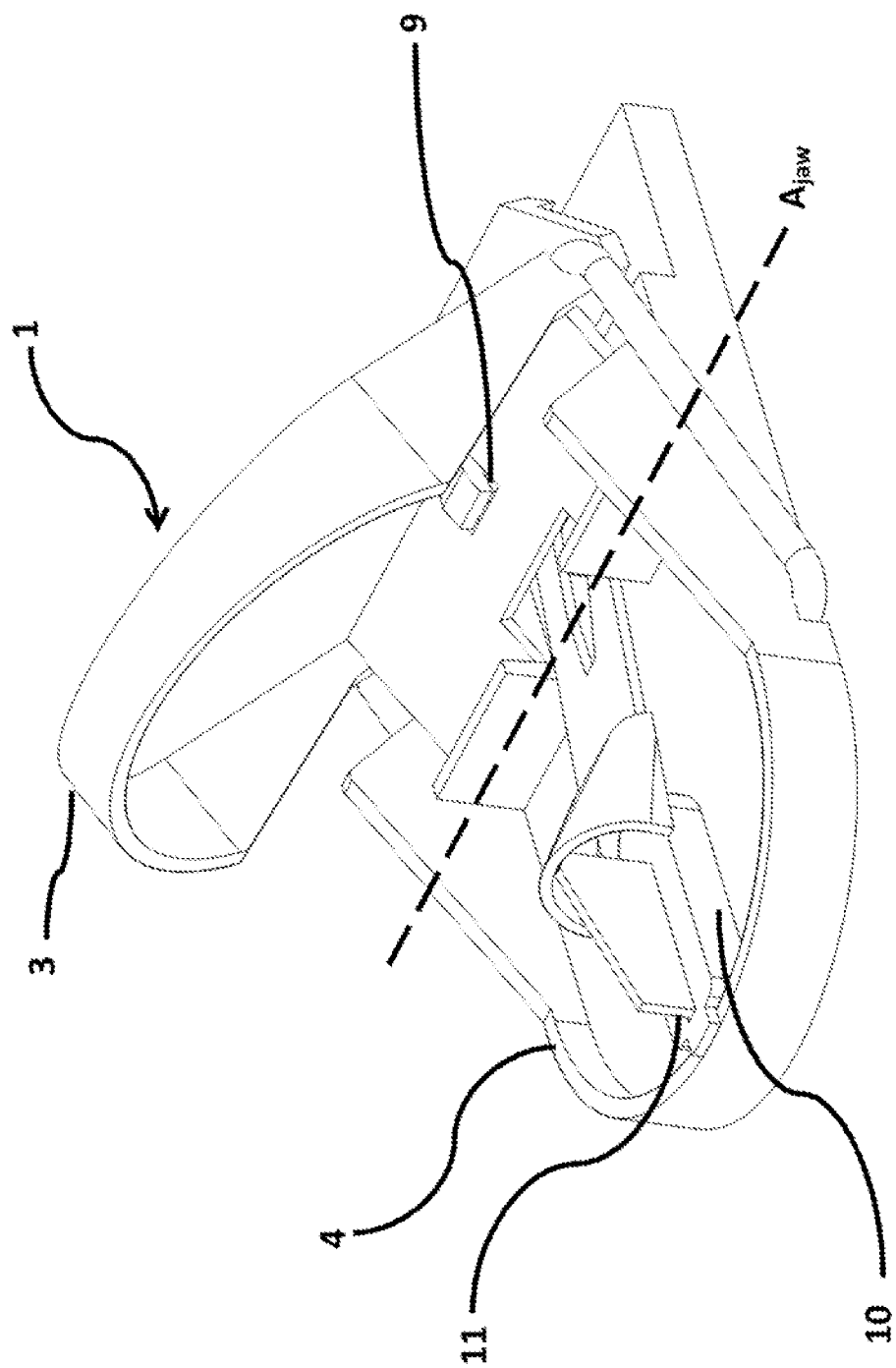
Figure 5:
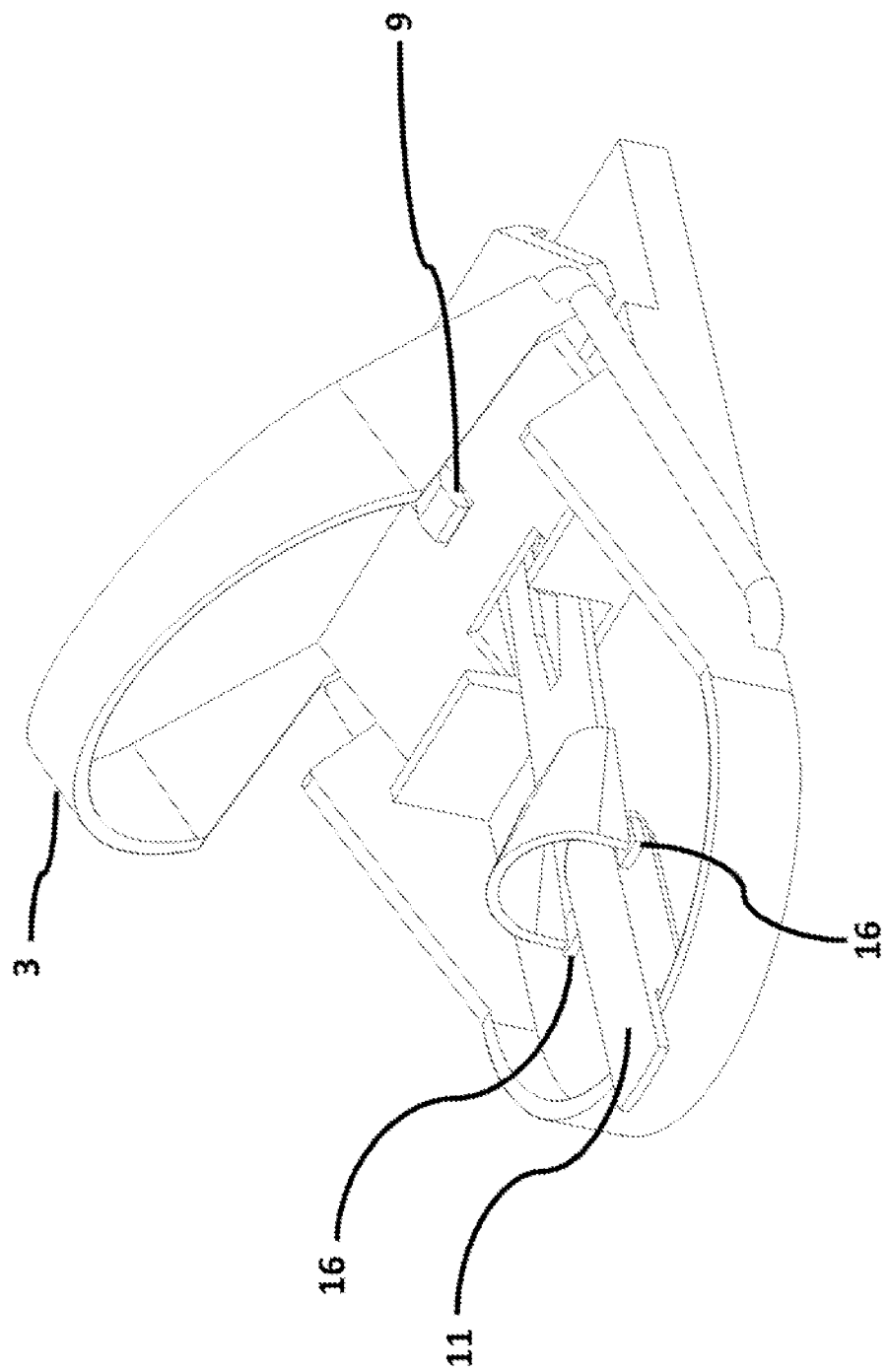
Figure 6:
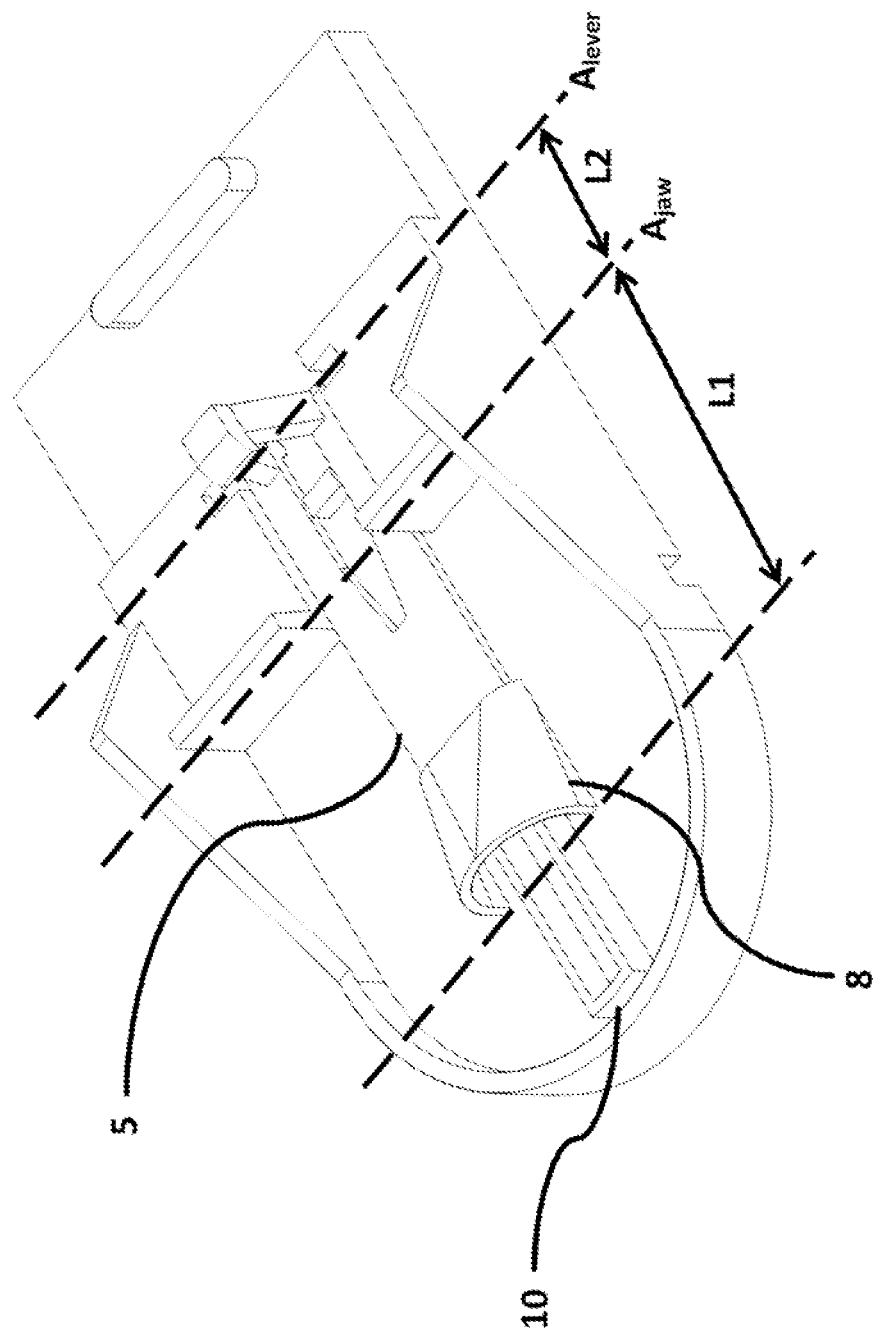
Figure 7:
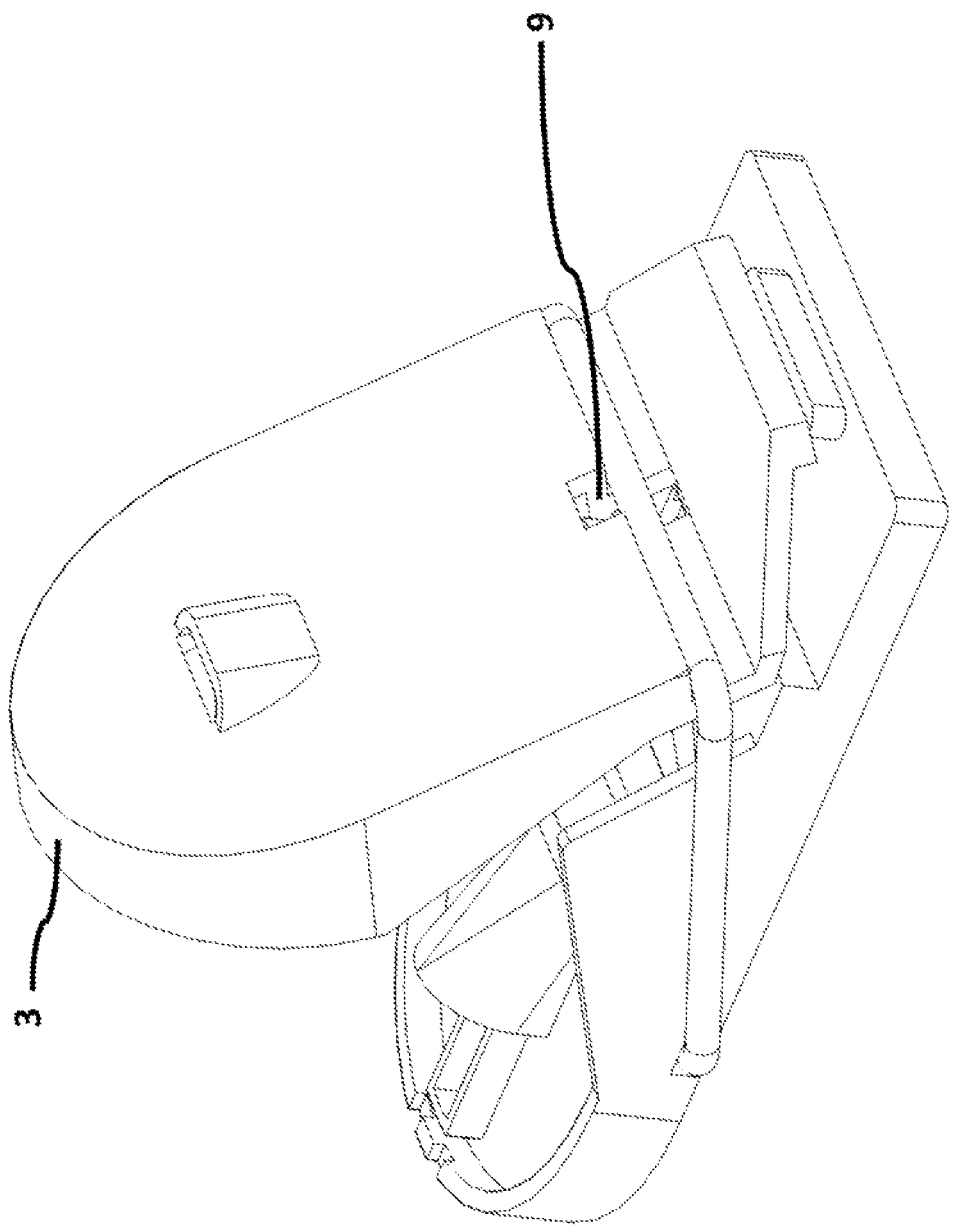
Figure 8:
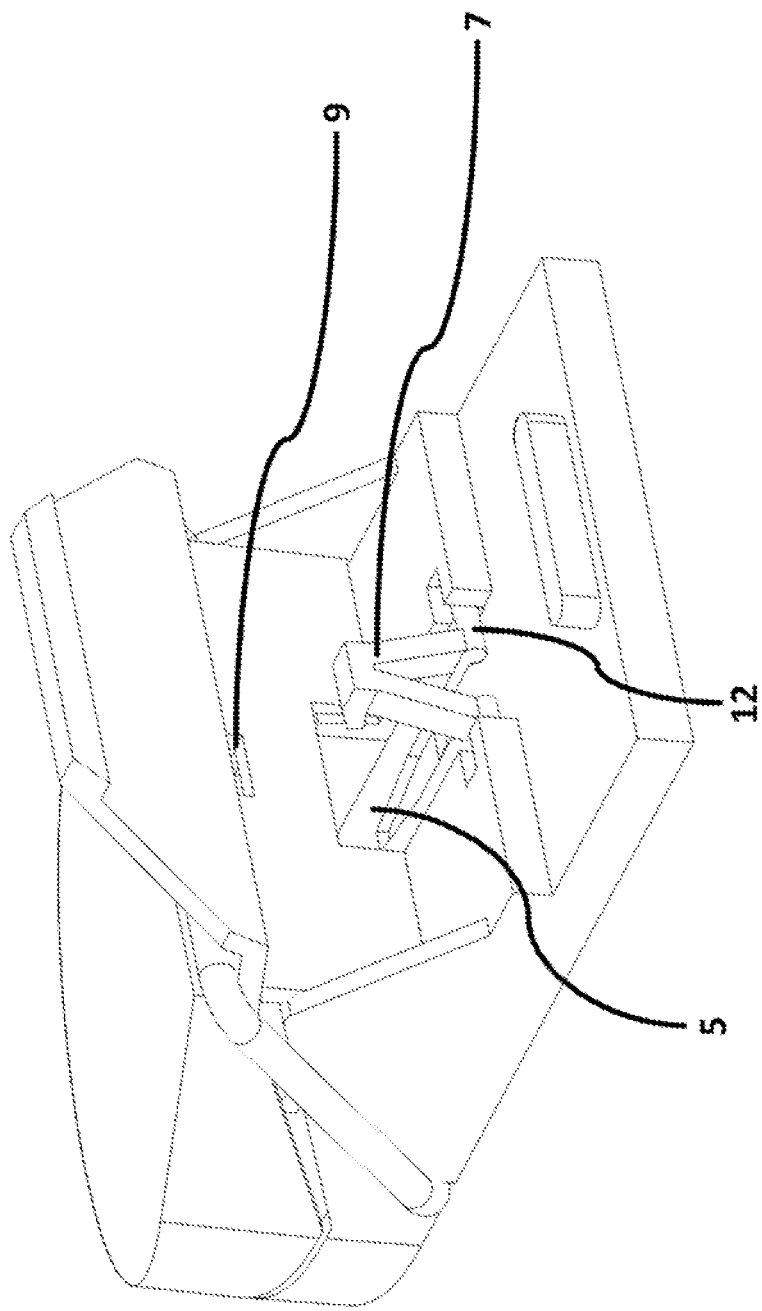
Figure 9:
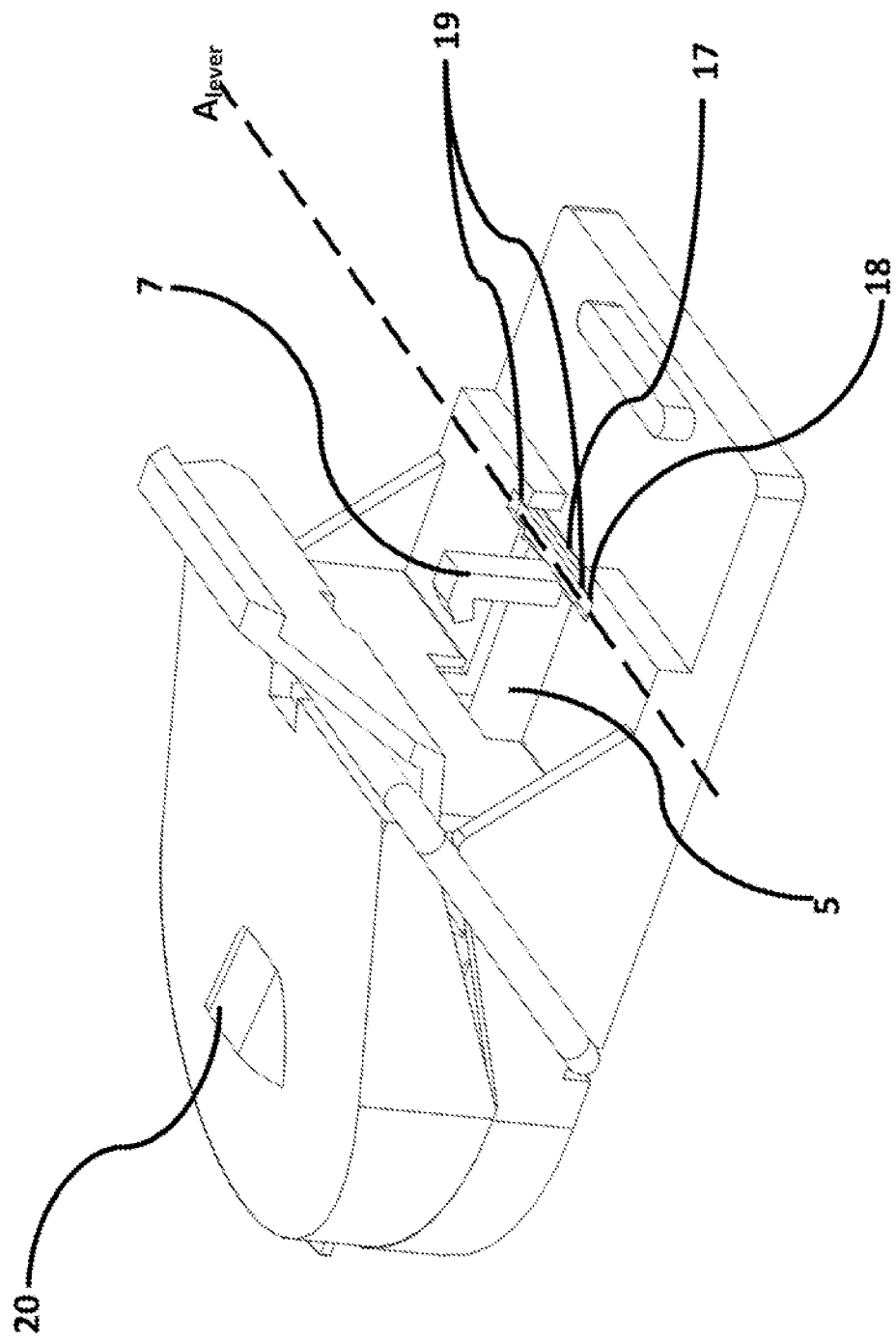
Figure 10:
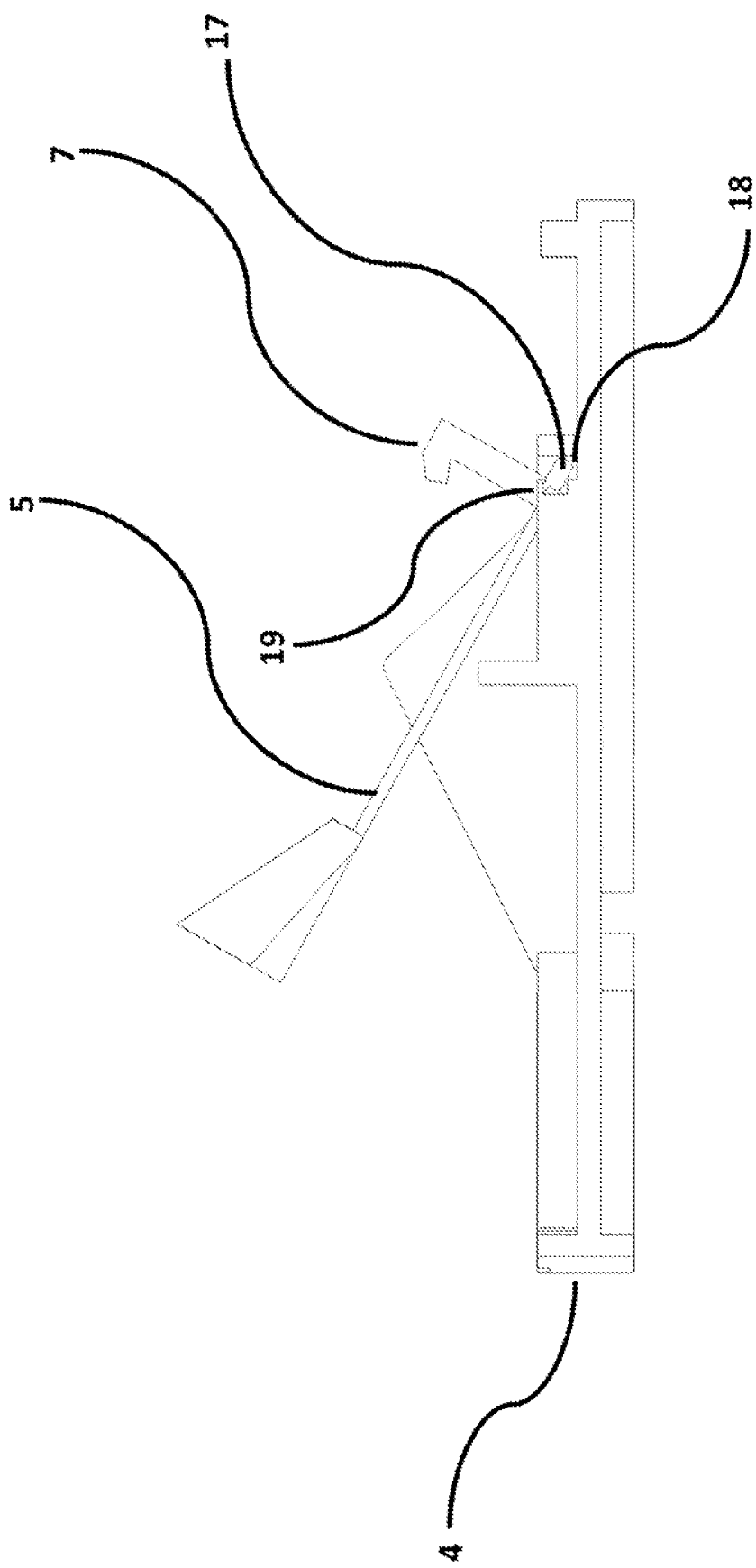

The invention is further described by means of figures in the following. It shows:

FIG. 1: A side view of a rodent trap according to the invention,

FIG. 2: a longitudinal section to a rodent trap according to FIG. 1,

FIG. 3: a perspective view of a rodent trap according to FIG. 1 in the open position, FIG. 4: an alternative embodiment of a rodent trap according to the invention in the perspective view, FIG. 5: an alternative embodiment of a trap according to FIG. 4, FIG. 6: a perspective view of a trap according to the invention without upper jaw part, FIG. 7: a perspective view of a trap according to the invention from the back side in the open position, FIG. 8: a perspective view of the trap according to the invention from the back side in a closed position, FIG. 9: a perspective view of the trap according to the invention in a closed position, FIG. 10: a cross sectional view of the trap according to FIG. 9.

FIG. 1 shows a rodent trap 1 in the open position. The rodent trap 1 comprises clamp means 2. The clamp means 2 comprise an upper jaw part 3 and a lower jaw part 4. In the open position, the upper jaw part 3 is lifted away from the lower jaw part 4. Both jaw parts 3, 4 comprise an edge as a front part of the jaw part 3, 4. Inside the rodent trap 1 lifting lever 5 is arranged to release the latch means (not shown) which keeps the upper jaw part 3 in the open position, when a rodent is inside the trap. When the upper jaw part is released from the latch means (not shown) force means 6 in form of a single garter spring, forces the upper jaw part 3 into the direction to the lower jaw part 4 such that the front ends of both jaw parts are moved to each other. The force means 6 have a longitudinal centreline CL which is arranged substantially perpendicular to a jaw rotational axis $A_{jaw}$ see FIG. 3. The lifting lever 5 comprises rodent accommodating element 8 which has a funnel shaped opening for accommodating the nose of a rodent. The lifting lever 5 is activatable by a rodent on a first side FS of the jaw rotational axis $A_{jaw}$ (see FIG. 3). The latch means 7 are arranged on a latch side LS of the lifting lever 5 and are arranged on the second side SS of the jaw rotational axis $A_{jaw}$ (see FIG. 3). The second side SS is arranged opposite of the first side FS of the jaw rotational axis. The distance D between rodent accommodating element 8 and front side of the lower jaw part 4 is substantially 15 mm for a mouse trap and substantially 40 mm for a rat trap. Apart from the force means 6, which is a garter spring, the rodent trap is made from plastic material to accommodate the force means 6 in the rodent trap the upper jaw part 3 and the lower jaw part 4 comprise spring grooves. The spring grooves are arranged such that the force of the force means 6 is distributed optimally.

FIG. 2 is a longitudinal section of the rodent trap 1 according to FIG. 1. In the section additional to the features al-ready shown in FIG. 1, the latch means 7 and the bait holding element 10 are visible. The latch means 7 engage latch receiving element 9 in the upper jaw part 3. A funnel shaped rodent accommodating element 8 is additionally shown. The bait holding element 10 is partly arranged beneath the funnel shaped element 8 and extends beyond the funnel shaped rodent accommodating element 8 to entice a rodent into the trap. The force means 6 is arranged in the two force means slots of the upper jaw part 3 and the lower jaw part 4 respectively. To open the trap 1 and put the upper jaw part 3 into an open position, the user has to push down activating lever 14 into the direction of the lower jaw part 4. The upper jaw part 3 then swings around the jaw rotational axis $A_{jaw}$ (see FIG. 3) into the open position. When the latch means 7 are released, the upper jaw part 3 swings back around the jaw rotational axis $A_{jaw}$ into the closed position. The lifting lever 5 comprises a rotational length $L_{rot}$ which extends from the front of the rodent accommodating element 8 to the rotational axis $A_{lever}$ of the lifting lever 5. The latch means 7 comprise a length $L_{latch}$ which extends from the rotational axis $A_{lever}$ of lifting lever 5 the point of the latch means 7 where to latch means hook into the latch receiving element 9. The rotational length $L_{rot}$ of lifting lever 5 is larger than the latch length $L_{latch}$ to enable a small movement of the lifting lever 5.

FIG. 3 shows a perspective view of a rodent trap 1 according to the invention in an open position. The upper jaw part 3 swings around jaw rotational axis $A_{jaw}$ from an open into a closed position and vice versa. To activate the rodent trap 1 the user has to push down activating lever 14. A first length of L1 of the lifting lever 5 which is the length of the lever between a jaw rotational axis $A_{jaw}$ and front of rodent accommodating element 8 is larger than a second length L2 (see FIG. 6) of lifting lever 5 arranged between jaw rotational axis $A_{jaw}$ and end of the two-prong fork shaped end 12 of the lifting lever 5 (see FIG. 6). The two prongs of two-prong fork shaped end 12 and kept away from each other in by blocking element 13.

FIG. 4 shows an alternative embodiment of the rodent trap 1 of FIG. 3 in the open position. In this embodiment the bait holding element 10 is covered by a cap 11 to keep the bait fresh. The cap 11 extends beyond the lower jaw part 4 and comprises a handle to easily remove the cap 11. This leads to a visibility to a user even in the closed state of the trap 1 that the bait is still covered by a cover. Furthermore, in this perspective the two-prong fork shaped end 12 of the lifting lever 5 is visible. Between the two prongs of the two-prong fork shaped end 12 blocking element 13 is arranged to keep the prongs apart as soon as the lifting lever 5 is arranged on the lower jaw part 4. Furthermore, in this figure the latch receiving element 9 of upper jaw part is visible. All of the features correspond to the previous figures.

FIG. 5 shows an alternative embodiment of the cap 11 without handle. Still the cap 11 extends beyond the front part 15 of the lower jaw part 4. This leads to a visibility to a user even in the closed state of the trap 1 that the bait is still covered by a cover. Furthermore, in this perspective the two-prong fork shaped end 12 of the lifting lever 5 is visible. Between the two prongs of the fork blocking element 13 is arranged to keep the prongs apart as soon as the lifting lever 5 it arranged on the lower jaw part 4. Wings 16 are provided on the cap 11 to keep the lifting element in a lifted position when the cap is on the bait holding element.

FIG. 6 shows a perspective view of the rodent trap 1 without showing the upper jaw part 3. The first length L1 of a lifting lever 5 is larger than the second length L2 of lifting lever 5. The lever rotational axis $A_{lever}$ is arranged in parallel to the jaw rotational axis $A_{jaw}$. The latch means 7 are arranged close to the lever rotational axis $A_{lever}$ such that the distance the lifting lever 5 needs to be moved at the rodent accommodating element 8 is larger than the distance the latch means 7 needs to move to activate the trap.

FIG. 7 shows a back side view of the trap 1 according to the invention. The latch receiving element 9 of upper jaw part 3 is explicitly visible. All other features correspond to the previous figures.

FIG. 8 shows the back side view of the trap 1 in a closed position. The latch means 7 is not connected to a latch receiving element 9. Additionally, the two-prong fork shaped end 12 of lifting lever 5 is clearly visible. All other features correspond to the previous figures.

FIG. 9 shows an alternative embodiment to the trap in FIG. 1 differing from the embodiment of FIG. 1 in the design of the lifting lever 5 and the design of the upper jaw part 3. The upper jaw part 3 comprises a dormer-shaped element 20. The dormer-shaped element 20 allows for a larger rodent accommodating element 8 while the trap 1 still can be as small as possible. The lifting lever 5 comprises a fixing element 17 being arranged at the lever rotational axis $A_{lever}$. The fixing element 17 is arranged in a slot 18. The slot 18 comprises two holding elements 19. The fixing element 17 has a rectangular shape (see FIG. 10). In a mounted position as shown in FIG. 9 the fixing element 17 is kept in the slot 18 by two holding elements 19. Nevertheless, the lifting lever 5 can be rotated around lever rotational axis $A_{lever}$.

FIG. 10 show a cross section of the lifting lever 5 and the lower jaw part 4. The fixing element 17 has a rectangular shape, while the longer sides of the rectangle are parallel to the lever length. the shorter sides of the rectangle are perpendicular to the lever length. When assembling the trap 1 the lifting lever 5 is brought in a position substantially perpendicular to the lower jaw part 4 and the fixing element 17 is inserted into the slot 18. The lifting lever 5 is then brought to the mounted position in the lower jaw 4 such that the fixing element 17 is fixed in the slot 18 by holding elements 19. The lifting lever 5 is thus fixed in the slot 18.

The invention claimed is:

1. A rodent trap (1) for catching and killing rodents, in particular mice and/or rats, comprising
   a clamp means (2) at least having an upper jaw part (3) and a lower jaw part (4), wherein the upper jaw part (3) is able to swing relative to the lower jaw part (4) from an open position to a closed position, in which it hits and kills the rodent,
   the upper jaw part (3) being at least partially rotatable around a jaw rotational axis ($A_{jaw}$), a lifting lever (5) for releasing the clamp means (2) from the open position, the lifting lever (5) being activatable by the rodent on a first side (f) of the jaw rotational axis ($A_{jaw}$),
   a force means (6), in particular at least one spring, enabling the clamp means (2) to change from the open position into the closed position when released,
   the lifting lever (5) comprising a latch means (7) on a latch side (LS) of the lifting lever (5) being arranged on a second side (SS) of the jaw rotational axis ($A_{jaw}$), opposite of the first side (FS) of the jaw rotational axis ($A_{jaw}$), wherein the trap (1) is only activatable via the lifting lever (5) being lifted upwards on the first side (FS) of the jaw rotational axis ($A_{jaw}$), wherein the lifting lever (5) is lifted away from the lower jaw part of the trap (1).

2. The rodent trap (1) according to claim 1, wherein the lifting lever (5) comprises a rodent accommodating element (8) having an at least partially rounded shape, arranged opposite of the latch side (LS).

3. The rodent trap (1) according to claim 1 wherein the force means (6) in the closed position exerts a closing force on the upper jaw part (3) and the lower jaw part (4) such that both jaws (3, 4) are pressed against each other, wherein a longitudinal centerline (CL) of the force means (6) is located beside the jaw rotational axis ($A_{jaw}$), on the first side (FS) of the jaw rotational axis ($A_{jaw}$).

4. The rodent trap (1) according to claim 1, wherein a longitudinal centerline (CL) of the force means is located closer to the jaw rotational axis ($A_{jaw}$) in the open position compared to the closed position, so that the force means (6) in the open position exerts a lower force on the upper (3) and the lower jaw part (4) than in the closed position, wherein the longitudinal centerline (CL) of the force means (6) is located slightly on the first side (FS) of the jaw rotational axis ($A_{jaw}$) when the clamp means (2) is in the open position.

5. The rodent trap (1) according to claim 1, wherein a first length (L1) of the lifting lever (5) on the first side (f) of the jaw rotational axis ($A_{jaw}$) is longer than a second length (L2) of the lifting lever (5) on the second side(s) of the jaw rotational axis ($A_{jaw}$).

6. The rodent trap (1) according to claim 1, wherein the upper jaw part (3) comprises a latch receiving element (9) to be latched in the open position by the latch means (7).

7. The rodent trap (1) according to claim 1, wherein a rotational length (Lrot) of the lifting lever (5) is longer than a latch length ($L_{latch}$) of the latch means (7).

8. The rodent trap (1) according to claim 1, wherein a bait holding element (10) is arranged in the vicinity of the lifting lever (5), and beneath a rodent accommodating element (8), wherein the bait holding element (10) extends from beneath the rodent accommodating element (8) to substantially a front part (15) of the lower jaw part (4).

9. The rodent trap (1) according to claim 8, wherein a distance between the front part of the lower jaw part (4) and the rodent accommodating element (8) substantially perpendicular to the jaw rotational axis ($A_{jaw}$) is for a mouse trap in a range of 10 mm to 30 mm or for a rat trap in a range of 30 mm to 50 mm.

10. The rodent trap (1) according to claim 9, wherein the bait holding element (10) includes a cap (11).

11. The rodent trap (1) according to claim 9, wherein the bait holding element (10) is part of the lower jaw part (4).

12. The rodent trap (1) according to claim 1, wherein the lifting lever (5) comprises a lever rotational axis ($A_{lever}$) which is arranged on the second side(s) of the jaw rotational axis ($A_{jaw}$), wherein the latch means (7) are arranged at least partially substantially perpendicularly above or slightly beside the lever rotational axis.

13. The rodent trap (1) according to claim 1, wherein the lifting lever (5) comprises a substantially two-prong fork shaped end (12) on the latch side (L) of the lifting lever (5).

14. The rodent trap (1) according to claim 13, wherein the lower jaw part (4) comprises a blocking element (13) which is arranged between the two prongs of the fork shaped end (12) of the lifting lever (5) to prevent the lever to release from the lower jaw part (4).

15. The rodent trap (1) according to claim 12, wherein the lifting lever (5) comprises a fixing element (17) being arranged at the lever rotational axis ($A_{lever}$), wherein the fixing element (17) is arranged in a slot (18), wherein the slot (18) preferably comprises at least one holding element (19).

16. The rodent trap (1) according to claim 1, wherein the lifting lever (5) has a length of 3 to 7 cm, for a mouse trap and has a length of 8 to 13 cm for a rat trap.

17. A system for refilling the rodent trap (1) according to claim 1 comprising a syringe with a bait refill.

18. A method of refilling the rodent trap (1) according to claim 1, wherein the rodent trap (1) is arranged in the open position and a bait is refilled, preferably into a bait holding element (10), using a syringe comprising bait, preferably peanut butter.

19. A method of catching and preferably killing a rodent comprising the step of positioning a rodent trap (1) according to claim 1, on a surface and putting the rodent trap (1) into the open position.

* * * * *